(No Model.)
G. M. WESTMAN.
PROCESS OF AND APPARATUS FOR TREATING ARSENIC ORES.
No. 577,802. Patented Feb. 23, 1897.
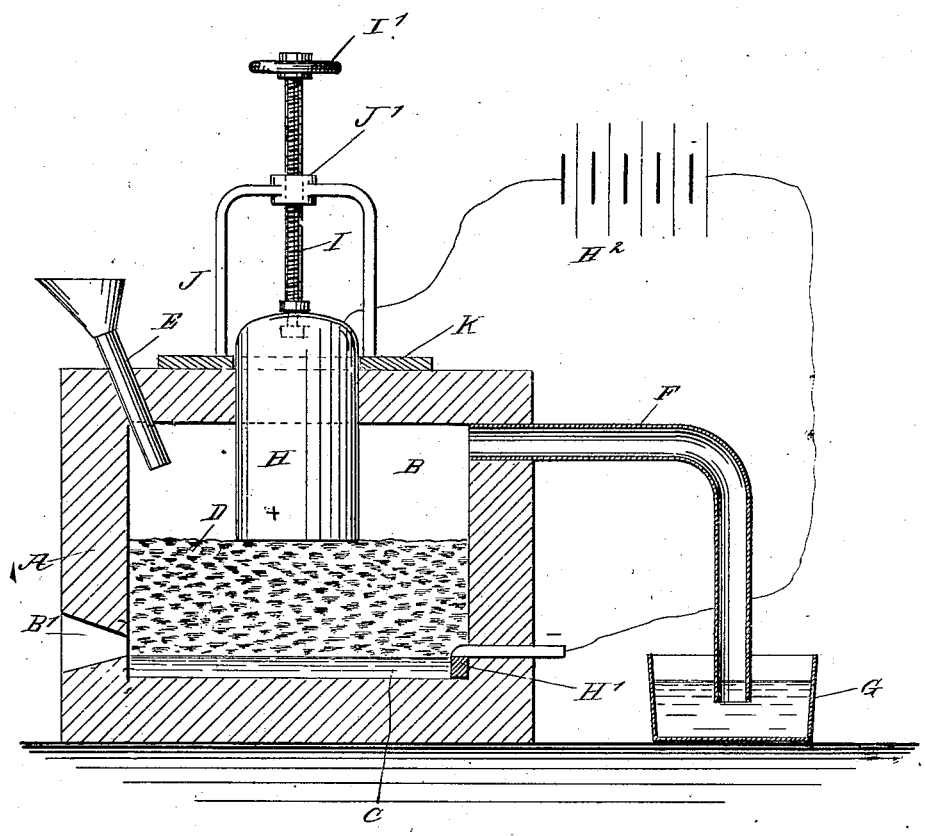

UNITED STATES PATENT OFFICE.

GUSTAF M. WESTMAN, OF NEW YORK, N. Y.

PROCESS OF AND APPARATUS FOR TREATING ARSENIC ORES.

SPECIFICATION forming part of Letters Patent No. 577,802, dated February 23, 1897.

Application filed July 8, 1895. Serial No. 555,272. (No model.)

*To all whom it may concern:*

Be it known that I, GUSTAF M. WESTMAN, of New York, in the county and State of New York, have invented a new and Improved Process of and Apparatus for Treating Arsenic Ores, of which the following is a full, clear, and exact description.

The object of the invention is to provide a new and improved process of and apparatus for treating arsenic ores in such a manner as to readily and economically free the arsenic from the ores, to produce metallic arsenic, and also to separate and save any precious metals contained in the ores, as well as the iron.

The process involves a dual treatment of arsenic ores, as hereinafter set forth.

In order to carry this process into effect, I provide a furnace such as shown in the accompanying drawing, in which the figure is a sectional side elevation of the furnace.

The furnace A is provided with a melting-chamber B, having a tap-hole B' and formed with a bottom C, made of lead, for supporting the ores D to be treated and representing the negative pole. The ores are fed into the melting-chamber B through a suitable spout E or other device, and the upper end of the melting-chamber is connected by a flue F with a condenser G, preferably in the form of a tank containing water, into which extends the lower end of the flue F.

The ore D, which is preferably mispickel, is melted in the chamber B by electricity, and for this purpose I employ a positive electrode H, fitted to slide in the top of the furnace A to permit of raising and lowering the carbon to engage the lower end thereof with the ore D and make a good connection. The electrode H is made of a suitable material—such as iron coated on the sides with enamel—to prevent the metallic-arsenic vapors from adhering to it. The enamel is a slag composition, and when the furnace is in use the enamel becomes coated with metallic arsenic and appears to be unaffected by heat, as has been demonstrated by practical test.

In the bottom of the chamber B is arranged the negative pole H' at the lead bottom C, and the two electrodes H and H' are connected with a suitable source of electricity H², it being understood that the electricity passes through the ore D in making its circuit. In order to conveniently raise and lower the electrode H to insure a good contact with the ore, I prefer to engage the upper end of the electrode H with the lower end of a screw-rod I, screwing in a nut J', formed in a bracket J, projecting from a top plate K, through which passes the electrode H. By manipulating the wheel I' of the screw-rod I the operator is enabled to raise or lower the electrode H. The said screw-rod I is electrically insulated by the brickwork of the furnace, so that short-circuiting is prevented.

When the several parts are in the position shown in the drawing and the chamber B is charged with the ore and proper contact is made by the electrodes H and H' with the ore, then the electricity passing through the ore D melts the latter, so that the arsenic is freed in the form of vapors, which rise in the melting-chamber B and pass through the flue F to the condenser G to be precipitated therein in the form of metallic arsenic. The precious metals contained in the ore D are taken up by the lead bottom C, which of course is also in a melted state, and the molten iron sulfid is run off through the tap-hole B' after the arsenic is completely freed from the ore and the precious metals have been taken up by the lead. A new charge of ore is then passed into the chamber B and the above-described operation is repeated, it being understood that a number of charges may be treated in the furnace before it will be necessary to remove the lead bottom C, containing the precious metals, and substituting a new one therefor.

Having thus fully described my invention, I claim as new and desire to secure by Letters Patent—

The hereinbefore-described dual process of treating arsenic ores, for obtaining therefrom the metallic arsenic and separating and saving the precious metals contained therein, which consists in melting such ore by means of an electric current, one of the electrodes in the circuit being a stratum of lead, beneath the ore, with which the precious metals unite while molten, and, second, condensing the arsenical vapors given off from the ore while melted, simultaneously with the precipitation and union of the precious metals with the lead, as specified.

GUSTAF M. WESTMAN.

Witnesses:
THEO. G. HOSTER,
C. SEDGWICK.